Dec. 17, 1957  I. BOTNICK  2,816,746
COMBINATION AERATING AND HOSE COUPLING DEVICE FOR FAUCETS
Filed Jan. 19, 1956

INVENTOR.
IRLIN BOTNICK
BY
Sanford Schnurmacher
ATTORNEY

United States Patent Office 2,816,746
Patented Dec. 17, 1957

2,816,746

COMBINATION AERATING AND HOSE COUPLING DEVICE FOR FAUCETS

Irlin Botnick, Cleveland, Ohio

Application January 19, 1956, Serial No. 560,111

4 Claims. (Cl. 261—64)

This invention relates to faucet couplings and particularly to a combination aerator and hose coupling.

Conducive to a better understanding of the invention, it may be well to point out that it is common practice to attach so-called aerators to water faucets which act to inject air into the water passing through them so that the water is charged with a myriad of air bubbles which is deemed to add to its palatability and also reduces its tendency to splash or splatter when it strikes the bottom of the sink or bowl with which the faucet is associated, since such devices also act to reduce the pressure of the water passing through them due to the constricted passages which form a part of their structure.

When such devices are used on kitchen or laundry faucets, it is impossible to temporarily connect hose lines thereto which lead to portable dishwashing or clothes washing machines for two reasons: (1) the back pressure of the aerator reduces the amount of water that can pass through the device to the machine below the volume required by water-powered machines for effective operation, and (2) the opposition to the free passage of water from the aerator, by the attached hose, causes the water to back up and spray out of the air injection ports of the aerator.

The primary object of this invention, therefore, is to provide an aerating device for water faucets that can operate either as an aerator or a means for coupling a hose to the faucet, with equal efficiency for either purpose.

Another object is to provide an aerator of the type defined that will not spray water out of its air ports when used as a hose coupler.

A further object is to provide such a device that will deliver un-aerated water under full line volume when a hose is coupled thereto.

Still another object is to provide a device of the type stated that is rugged in structure, reliable in operation and relatively inexpensive to manufacture.

These and other objects of the invention will become apparent from a reading of the following specification and claims, together with the accompanying drawing wherein like parts are referred to and indicated by like reference characters and wherein:

Figure 1:
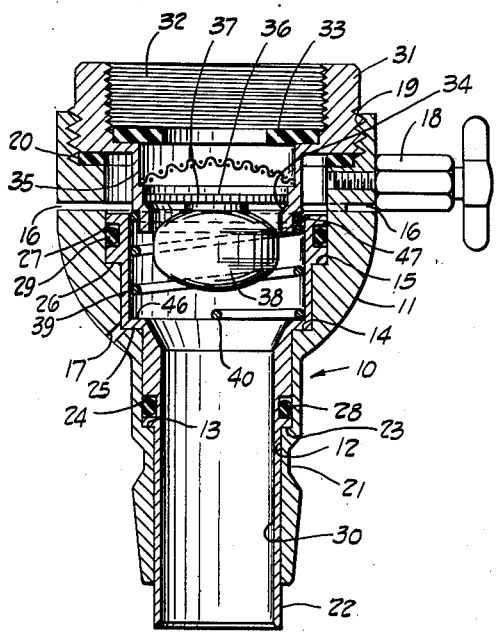
Figure 1 is a vertical sectional view of the combination faucet aerator and hose coupler that is the subject of this invention as it appears when operating as an aerator.

Referring more particularly to the drawing, there is seen in the Figure 1 the combination water aerator and hose coupler that is the subject of this invention, broadly indicated by reference numeral 10. As illustrated in Figure 1, the position of the elements thereof are shown as they appear when the device is operating as an aerator.

The device comprises a casing 11 made of any suitable non-corrosive material, and in its preferred form is made of aluminum which combines lightness in weight with resistance to corrosion. The casing has a central bore 12 therethrough which is divided into lower, middle and upper sections, of progressively larger diameter, by shoulders 13, 14 and 15 respectively. An air relief vent 17 intersects the bore 12 at the shoulder 14. Three laterally extending air ports 16 intersect the bore 12 at its inlet section above the shoulder 15. A water pressure bleeder valve 18, normally closed, also intersects the wall of the upper section of the bore 12. The inlet end of the bore 12 is threaded internally at 19 and has a recess upon which a rubber gasket or washer 20 is seated. A faucet engaging nut 31 is threadedly engaged with the casing threads 19 in pressed engagement against the washer 20. The nut 31 has an internally threaded bore 32 which engages the threaded end of the faucet, not shown, to which it is to be attached. The nut 31 has a dependent circular hollow apron 35 formed integral therewith, of smaller diameter than the body of the nut 31 to which it is joined through a shoulder which acts as a seat for the faucet sealing washer 33.

Figure 2:
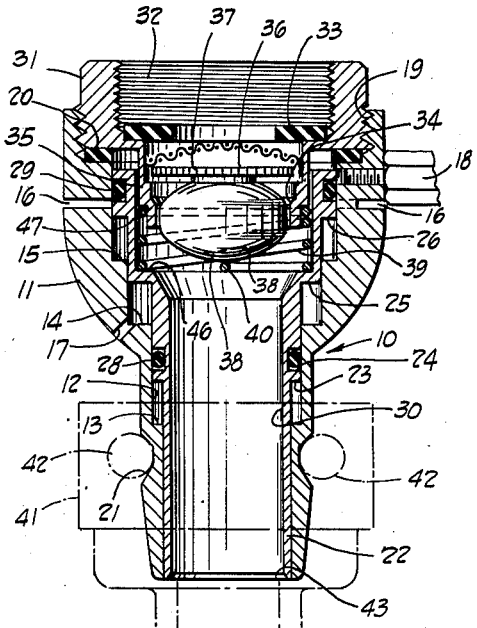
Figure 2 is a vertical sectional view of the device as it appears when used as a hose coupler with a hose having a snap-on fitting.

Reference numeral 36 indicates a flat disc which is freely seated against a shoulder 34 formed in the inner wall of the apron 35. The disc has a notched edge 37 and a dependent ball 38 attached to the center of the under side thereof. The length of the apron 35 is such that it extends below the position of the ports 16 when the nut 31 is mounted within the casing 11, as illustrated in Figures 1 and 2. The apron is also spaced from the inner face of the bore 12.

Reference numeral 22 indicates a sleeve which is slidably mounted within the casing bore 12. The sleeve 22 has a bore 30 therethrough and three vertically spaced external shoulders 23, 25 and 26, which seat against the shoulders 13, 14 and 15 respectively of the casing bore 12.

Figure 3:
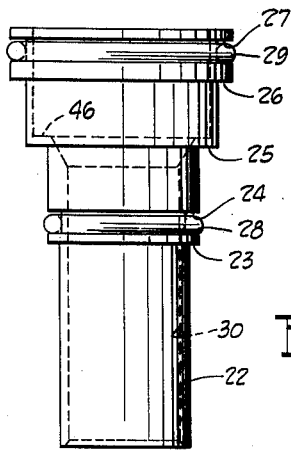
Figure 3 is a front elevation of the sleeve member in its disassembled condition.

Reference numerals 28 and 29 indicate circular gaskets which are positioned in circular grooves 24 and 27 respectively of the sleeve 22, as is shown most clearly in Figure 3. These gaskets bear against the face of the casing bore 12 and form a water-tight seal between the sleeve and casing.

The diameter of the sleeve bore 30 is enlarged above the point of the external shoulder 25. At the point of enlargement there is an internal shoulder 46 which acts as a seat for the lower end of coil spring 39 which is attached at its upper end to a groove 47 in apron 35. The spring is bent at its lower end to form a diametrically extending bar 40 that is centered below the center of the disc ball 38. The spring 39 acts to normally bias the sleeve away from the apron 35 as seen in Figure 1. In this normal or first position, the sleeve shoulders 23, 25 and 26 are seated against the shoulders 13, 14 and 15 respectively of the casing bore 12. In this position of the sleeve 22, the sealing gasket 29 is below the plane of the air ports 16, as seen in Figure 1.

Water entering the device through the top thereof presses against the disc 36, holding it firmly against its seat 34. The only passage around the disc is through the openings between the notches in the disc edge 37, which causes the stream of water to be broken up into a plurality of spray-like streams which pass through the interior of the apron 35 and past the ball 38. The velocity of the flow of water through this constricted area creates a negative pressure which causes air to be drawn in through the port slots 16. The so-aerated water then passes out through the bore 30 of the sleeve 22.

When it is desired to couple a hose to the device, a typical snap-on fitting 41, indicated in broken outline in Figure 2, is slipped over the lower end of the casing 11. The fitting 41, illustrated, has three locking balls which fit into an annular external groove 21 in the casing 11. This ball and groove locking arrangement is commonly used for this purpose and no novelty is claimed for same.

The snap-on fitting 41 has a tapered nipple 44 joined to the body of the fitting through a shoulder 43. A bore 45 extends through the nipple 44 and when secured to the casing as shown in Figure 2 forms a continuation of the sleeve bore 30. A hose 48 is fitted over the exterior of the nipple in the usual manner.

It will be noted, by referring to Figure 1, that the lower end of the sleeve 22 normally extends below the end of the casing bore 12. However, when the fitting 41 is attached to the casing 11, the shouldered end 43 of the nipple 44 bears against the lower end of the sleeve 22 and forces it to move upward of the bore 12, against the biasing action of the spring 39 to take the position illustrated in Figure 2. In this second position, the sleeve gasket 29 is above the air ports 16, which are thereby sealed off from the interior of the device. At the same time, the lower gasket 28 forms a seal between the sleeve 22 and the casing bore 12, below the ports 16, thereby preventing water from bracking up and flowing out of the ports 16. Thus the ports 16 are sealed off both from above and below. At the same time, the upward movement of the sleeve 22 causes the compression of the spring 39. This shortening of the spring 39 causes the cross bar 40 to contact the ball 38 and lift it upward. The disc 36 which is now supported by the ball 38 is in turn moved upward and away from its seat 34, thereby leaving an enlarged and free passageway around the edge thereof for the unopposed flow of water. The casing 11 now acts as a mere extension of the faucet and un-aerated and free flowing water is free to travel through the device 10 into the hose 48.

When the snap-on fitting 41 is removed, the spring 39 again acts to bias the sleeve downward to take the position illustrated in Figure 1. At the same time, the unsupported disc falls into place against its seat 34. The downward movement of the sleeve 22 causes the sealing gasket 29 to move below the air ports 16, restoring their connection to the interior of the water passageways.

Any air trapped between the gaskets 28 and 29 is vented through the bore 17, so that the sleeve is immediately free to travel longitudinally of the bore 12.

The bleeder valve 18 is useful in cases wherein the hose is connected to an automatic device having valves which cut off the flow of water in the device while the faucet valve remains open. In such cases, if the faucet valve is turned off and the snap-on fitting 41 tried to be removed, the trapped water in the hose line, still being under pressure, will spray all over when the seal is broken. However, the momentary opening of the valve 18 will relieve the pressure and assure the safe breaking of the seal.

It will therefore be apparent that there has been provided a single device that will function either as an aerator or a hose coupling, with equal efficiency and without requiring any special manipulation or skill on the part of the user.

While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. A combination aerating and hose coupling device for faucets comprising a casing having lateral air inlet ports and provided with a water inlet connection, a disc adjacent the ports having a notched edge transverse of the connection for discharging fine jets of water, an apron within the casing spaced from the wall thereof adjacent the ports, a sleeve slidably mounted in the outlet end of the casing and positioned between the ports and the apron, the said sleeve being slidable between a first position wherein it is clear of the ports and a second position wherein the sleeve covers the ports, and means for moving the sleeve between said first and second positions; the device acting as an aerator when the sleeve is in its first position and a hose coupler when the sleeve is in its second position.

2. A combination aerating and hose coupling device for faucets comprising a casing having lateral air inlet ports and provided with a water inlet connection, a disc adjacent the ports having a notched edge transverse of the connection for discharging fine jets of water, an apron within the casing spaced from the wall thereof adjacent the ports, a sleeve slidably mounted in the outlet end of the casing and positioned between the ports and the apron, the said sleeve being slidable between a first position wherein its upper end is clear of the ports while its lower end extends beyond the casing outlet and a second position wherein the upper end of the sleeve covers the ports while its lower end is flush with the casing outlet, and spring means mounted in the casing for normally biasing the sleeve to its first position; the device acting as an aerator when the sleeve is in its first position and a hose coupler when the sleeve is in its second position.

3. A combination aerating and hose coupling device for faucets comprising a casing having lateral air inlet ports and provided with a water inlet connection, an apron within the casing spaced from the wall thereof adjacent the ports, the apron having a circular seat of reduced diameter in the inner wall thereof adjacent the ports, a disc seated on the apron seat having a notched edge transverse of the connection for discharging fine jets of water, a dependent sphere mounted on the lower face of said disc, a sleeve slidably mounted in the outlet end of the casing and positioned between the ports and the apron, the sleeve having an inner shoulder spaced downward of the upper edge thereof, a coil spring mounted on the apron and seated at its lower end against the sleeve shoulder, the spring having a diametric section at the lower end thereof, the spring acting to normally bias the sleeve downward to a first position wherein the diametric spring section is spaced from the disc sphere and the upper end of the sleeve is clear of the ports, while the lower end of the sleeve extends beyond the casing outlet, the sleeve being slidable upwardly of the casing to a second position wherein the upper end of the sleeve covers the ports while the lower end of the sleeve is flush with the casing outlet, the upward movement of the sleeve relative to the casing acting to compress the spring to bring the diametric portion thereof into contact with the disc sphere, thereby raising the disc off its seat; the device acting as an aerator when the sleeve is in its first position and a hose coupler when the sleeve is in its second position.

4. A device of the type defined in claim No. 3 and further characterized by the sleeve having two spaced and parallel sealing rings engaged with the casing wall, both of said sealing rings being below the air ports when the sleeve is in its first position, one of said sealing rings being above the air ports when the sleeve is in its second position.

References Cited in the file of this patent

UNITED STATES PATENTS

| 2,089,646 | Friedrich | Aug. 10, 1937 |
| 2,405,375 | Smith | Aug. 6, 1946 |
| 2,707,624 | Shames et al. | May 3, 1955 |